United States Patent [19]

Lake, Jr. et al.

[11] Patent Number: 4,843,707
[45] Date of Patent: Jul. 4, 1989

[54] CABLE RETENTION SYSTEM

[75] Inventors: Ralph J. Lake, Jr., Yorba Linda; Dean-Yuan Liu, Canoga Park, both of Calif.

[73] Assignee: Sanders Associates, Inc., Nashua, N.H.

[21] Appl. No.: 86,918

[22] Filed: Aug. 19, 1987

[51] Int. Cl.$^4$ .............................................. A47B 13/00
[52] U.S. Cl. ........................................ 29/432; 29/525; 248/74.2; 312/223
[58] Field of Search ............. 248/65, 74.1, 74.2, 248/188.8, 205.3, 309.1, 316.1, 316.2, 316.7, 359 A, 360, 500, 506; 312/223, 196; 24/561, 562, 564, DIG. 22

[56] References Cited

U.S. PATENT DOCUMENTS

| | | | |
|---|---|---|---|
| 1,459,582 | 6/1923 | Dubee | 24/564 |
| 3,635,174 | 1/1972 | Ball | 312/223 |
| 3,696,920 | 10/1972 | Lahay | 248/205.3 |
| 4,094,561 | 6/1978 | Wolff | 312/223 |
| 4,163,867 | 8/1979 | Breidenbach | 312/223 |
| 4,535,703 | 8/1985 | Henriott | 312/223 |

FOREIGN PATENT DOCUMENTS

| | | | |
|---|---|---|---|
| 776393 | 1/1968 | Canada | 24/562 |
| 10301 | 4/1980 | European Pat. Off. | 248/188.8 |
| 47864 | 3/1982 | European Pat. Off. | 248/74.1 |
| 2916002 | 11/1980 | Fed. Rep. of Germany | 312/223 |
| 3239083 | 4/1984 | Fed. Rep. of Germany | 312/223 |
| 3340537 | 5/1985 | Fed. Rep. of Germany | 248/74.1 |
| 1527581 | 5/1968 | France | 24/561 |
| 2454012 | 12/1980 | France | 248/65 |

Primary Examiner—Alvin C. Chin-Shue
Assistant Examiner—Robert A. Olson
Attorney, Agent, or Firm—Donald A. Streck; Wm F. Porter, Jr.

[57] ABSTRACT

A method and apparatus for routing, holding, and hiding cables associated with electronics devices. The preferred embodiment is an extrusion for application to a surface of an electronics device or incorporation into the framework thereof defining a groove capable of routing, holding, and hiding the electrical cable(s). The extrusion has a cross-section comprising a plurality of sides connected to one another to define a desired shape for the extrusion. A pair of the sides have a generally V-shaped orientation with respect to one another thereby forming a longitudinal slot in the extrusion capable of containing the cable therein. The slot-forming pair of sides each includes opposed portions comprising a plurality of adjacent V-shaped segments thereby forming opposed longitudinal teeth in the sidewalls of the slot capable of releasably gripping a cable disposed in the slot.

2 Claims, 1 Drawing Sheet

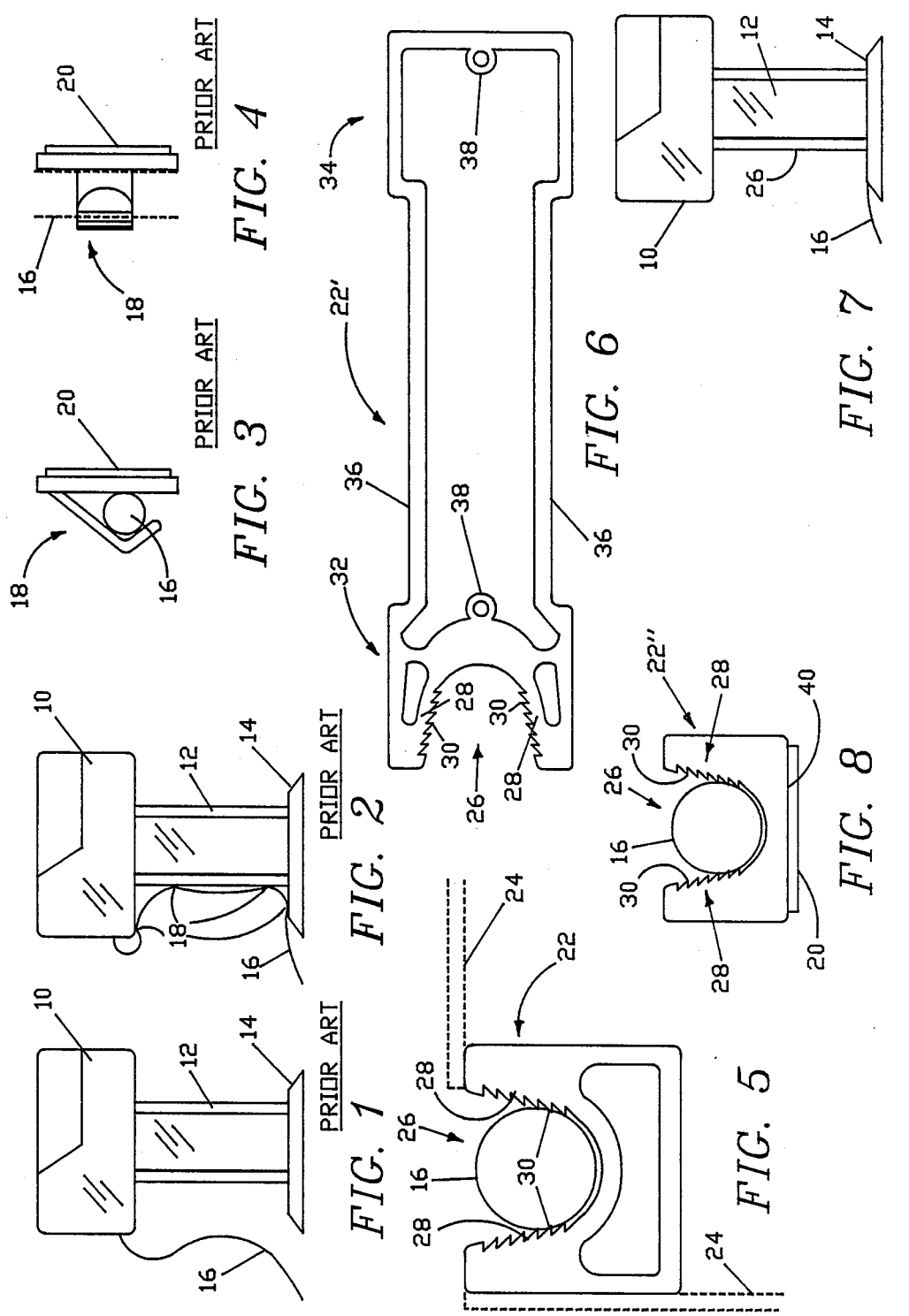

CABLE RETENTION SYSTEM

BACKGROUND OF THE INVENTION

The present invention relates to systems and apparatus for holding and routing cables and wires and, more particularly, to an extrusion for use in the construction of a frame for an electronics device or for application to a surface thereof and capable of routing and holding an electrical cable associated with the device wherein the extrusion has a cross-section comprising, a plurality of sides connected to one another to define a desired shape for the extrusion, a pair of the sides having a generally V-shaped orientation with respect to one another thereby forming a longitudinal slot in the extrusion capable of containing the cable therein, the pair of sides each including opposed portions comprising a plurality of adjacent V-shaped segments thereby forming opposed longitudinal teeth in the sidewalls of the slot capable of releasably gripping a cable disposed in the slot.

Most computers and the peripheral devices attached thereto are aesthetically pleasing except for the interconnecting cables employed with the devices. A typical graphics plotter appears as in FIG. 1 wherein the plotter 10 is raised on legs 12 standing on base 14. The plotter 10, legs 12, and base 14 are all designed to be aesthetically pleasing to the eye, which they are. Extending from the back, however, are one or more cables 16 providing power, signals, and the like. A typical prior art attempt to minimize the problem is shown in FIGS. 2–4. Clips 18 as shown in detail in FIGS. 3 and 4 are attached to the plotter 10, legs 12, and base 14 as with peel-and-stick tape 20 and are then used to hold the cables 16 at those points as shown in FIG. 2. While better than dangling cables, the clips 18 fall far short of creating an aesthetically pleasing solution.

Therefore, it is the object of the present invention to provide a cable retention system for use with electronic devices, and the like, wherein the cables are releasably retained in an aesthetically pleasing manner.

It is a further object of the present invention to provide a cable retention system for use with electronic devices, and the like, wherein the system can be incorporated into the construction of the device.

It is another object of the present invention to provide a cable retention system for use with electronic devices, and the like, wherein the system can be added to existing devices.

It is yet another object of the present invention to provide a cable retention system for use with electronic devices, and the like, which will route, hold, and hide cables over extended longitudinal distances.

Other objects and benefits of the present invention will become apparent from the description thereof contained hereinafter in combination with the drawing figure which accompany it.

SUMMARY

The foregoing objects have been attained by the extrusion of the present invention adapted for application to a surface of an electronics device or incorporation into the framework thereof and capable of routing, holding, and hiding an electrical cable associated with the device wherein the extrusion has a cross-section comprising a plurality of sides connected to one another to define a desired shape for the extrusion, a pair of the sides having a generally V-shaped orientation with respect to one another thereby forming a longitudinal slot in the extrusion capable of containing the cable therein, the pair of sides each including opposed portions comprising a plurality of adjacent V-shaped segments thereby forming opposed longitudinal teeth in the sidewalls of the slot capable of releasably gripping a cable disposed in the slot.

DESCRIPTION OF THE DRAWINGS

FIG. 1 is a side elevation of an electronic device as wherein the present invention is applicable.

FIG. 2 shows the device of FIG. 1 utilizing a prior art approach of employing clips to hold the cables at discrete points.

FIG. 3 is a top view of a prior art clip as employed in FIG. 2. FIG. 4 is a side view of the clip of FIG. 3. FIG. 5 is a cutaway view through a piece of extrusion as can be employed in the frames of electronic apparatus and incorporating the present invention therein.

FIG. 6 is a cutaway view through an extrusion as would be used for the leg 12 of apparatus such as that of FIG. 1 when employing the present invention therein. FIG. 7 shows the apparatus of FIG. 1 and its appearance when incorporating the present invention for the routing and retention of cables. FIG. 8 is a cutaway view through an extrusion according to the present invention which could be applied to apparatus by means of peel-and-stick tape for routing and retaining cables over longitudinal portions thereof.

DESCRIPTION OF THE PREFERRED EMBODIMENT

Broadly stated, the present invention comprises providing grooves or channels on the apparatus and its supporting structures for the routing, holding and hiding of the cables therein. While it would be possible to form the retaining grooves to be described hereinafter into the surface of the device itself within the scope and spirit of the present invention, applicants prefer the incorporation thereof into extrusions to be employed as part of the construction or, alternatively, adhesively attached to the surface.

Turning first to FIG. 5, the present invention is shown as being incorporated into an extrusion 22 as could be formed and incorporated into portions of a frame for the housing of an electronics device such as the plotter 10 of FIG. 1. Typically, the extrusion 22 of FIG. 5 incorporating the present invention would only be employed on the back side of the device with the remaining portions of the framework being constructed of similar extrusions not containing the retaining groove of the present invention. As depicted in FIG. 5, the extrusion 22, which is shown in cross-section in the figure, could be of aluminum, plastic, or the like. As understood by those skilled in the art, an extrusion is defined by its cross-section and, therefore, longitudinal or perspective drawings thereof will not be employed herein in the interest of simplicity. The extrusion 22 could be employed as longitudinal sections connected at the corners to form a structure defining the edges of a box-like structure defining the case of the device. Enclosing panels as indicated by the dotted lines 24 would then be attached to the extrusions 22 by screws, or the like, to enclose the case.

More particularly as to the retaining groove of the present invention, generally indicated as 26, it is formed by two spaced, opposed sidewalls 28 which, when viewed in cross-section, are generally V-shaped in appearance. The bottom of the "V" could be left open, however, applicants prefer that the bottom of the groove 26 be closed as shown in the figure. The groove 26 is formed to be deep enough to have one or more cables 16 disposed therein virtually out of sight from the side. As will be appreciated, by mitering the corners where two extrusions 22 meet at a 45° angle, the retaining grooves 26 can be made to be contiguous such that cables 16 can be routed continuously through interconnected grooves 26.

To retain the cables 16 within the groove 26 without the necessity of additional clips, or the like, the opposed sidewalls 28 have teeth 30 formed longitudinally therein. Thus, in cross-section, the teeth 30 appear as adjacent V-shaped segments. Since the opposed sidewalls 28 generally converge towards one another towards the bottom of the groove 26 because of their overall generally V-shaped orientation, the cables 16 are forced into contact with opposed rows of teeth 30 which are closer and closer together such that, ultimately, the teeth 30 bite into the outer surface of the cables 16 sufficiently to retain them within the groove 26 until pulled free therefrom.

An alternate extrusion 22' as contemplated by the applicants herein for use in forming the entire leg 12 of the apparatus of FIG. 1 is shown in cross-section in FIG. 6. The leg-forming extrusion 22' comprises a back vertical member 32 and a front vertical member 34 interconnected by decorative panel members 36. The back and front vertical members 32, 34 each contain extrusion portions 38 defining slots into which screws (not shown) can be threaded for attaching, for example, the plotter 10 and base 14 to either end of the legs 12. As can be seen from the figure, the retaining groove 26 of the present invention is incorporated into the back vertical member 32 of extrusion 22'. Employing extrusions 22, 22' of FIGS. 5 and 6 to construct the case for the plotter 10 and the legs 12 thereof of FIG. 1 provides apparatus which, in use, would appear as in FIG. 7 where the cables 16 are hidden from view from the side within the retaining grooves 26 to emerge adjacent the base 14, where they can be conveniently routed along the floor and be hidden by covers provided for such purpose, if desired.

An alternate approach to the present invention is shown in FIG. 8 wherein an extrusion 22" containing the retaining groove 26 of the present invention is shown as having a flat back surface 40 to which peel-and-stick tape 20 as employed with the clips 18 of FIGS. 3 and 4 is applied. Using the tape 20, longitudinal segments of the extrusion 22" can be applied to the surface of electronic devices not containing the present invention incorporated therein to obtain the benefits thereof. Unlike the clips 18, the extrusion 22" of the present invention retains, routes, and hides the cables 16 in an aesthetically pleasing manner.

Wherefore having thus described our invention, we claim:

1. The method of routing, holding, and hiding a cable with an exterior associated with an electronics device having a surrounding case comprising the steps of:
   (a) forming an elongated, longitudinal, cable routing, holding and hiding groove having inwardly converging opposed sides into a surface of the case;
   (b) forming a plurality of opposed longitudinal teeth in the opposed sides of the groove capable of releasably gripping the exterior surface of a cable disposed in the groove; and,
   (c) pressing the cable into the groove sufficiently that the teeth bite the exterior surface thereof and hold the cable in the groove.

2. The method of routing, holding, and hiding a cable with an exterior surface associated with an electronics device having a surrounding case comprising the steps of:
   (a) forming interconnected, elongated, longitudinal, cable routing, holding, and hiding grooves having inwardly converging opposed sides into surfaces of the case;
   (b) forming a plurality of opposed longitudinal teeth in the opposed sides of the grooves capable of releasably gripping the exterior surface of a cable disposed in the grooves; and,
   (c) pressing the cable into the grooves sufficiently that the teeth bite into the exterior surface thereof and hold the cable in the grooves.

* * * * *